United States Patent
Morii et al.

(10) Patent No.: US 8,732,848 B2
(45) Date of Patent: May 20, 2014

(54) FILE-DISTRIBUTION APPARATUS AND RECORDING MEDIUM HAVING FILE-DISTRIBUTION AUTHORIZATION PROGRAM RECORDED THEREIN

(75) Inventors: Shizue Morii, Osaka (JP); Daisuke Yoshida, Osaka (JP); Keisaku Matsumae, Osaka (JP)

(73) Assignee: KYOCERA Document Solutions Inc. (JP)

( * ) Notice: Subject to any disclaimer, the term of this patent is extended or adjusted under 35 U.S.C. 154(b) by 698 days.

(21) Appl. No.: 12/940,779

(22) Filed: Nov. 5, 2010

(65) Prior Publication Data

US 2011/0107106 A1 May 5, 2011

(30) Foreign Application Priority Data

| Nov. 5, 2009 | (JP) | ................................. 2009-254053 |
| Nov. 5, 2009 | (JP) | ................................. 2009-254054 |
| Feb. 12, 2010 | (JP) | ................................. 2010-028779 |

(51) Int. Cl.
- *H04L 9/32* (2006.01)
- *G06F 15/16* (2006.01)
- *G06F 21/00* (2013.01)
- *G06F 21/62* (2013.01)

(52) U.S. Cl.
CPC ............ *G06F 21/62* (2013.01); *H04L 2209/60* (2013.01); *H04L 9/3247* (2013.01)
USPC ...................... 726/27; 726/26; 726/4; 726/1

(58) Field of Classification Search
CPC ........................... G06F 21/62; H04L 2209/60
See application file for complete search history.

(56) References Cited

U.S. PATENT DOCUMENTS

| 6,128,738 | A | * | 10/2000 | Doyle et al. | ................... | 713/185 |
| 7,984,485 | B1 | * | 7/2011 | Rao et al. | ........................... | 726/3 |
| 2005/0114333 | A1 | * | 5/2005 | Nagano et al. | ................... | 707/8 |
| 2005/0138401 | A1 | * | 6/2005 | Terao et al. | ................... | 713/189 |
| 2007/0183448 | A1 | * | 8/2007 | Ochiai | ......................... | 370/463 |
| 2007/0192612 | A1 | * | 8/2007 | Morohashi | ................... | 713/176 |
| 2009/0064289 | A1 | * | 3/2009 | Jang | ................................. | 726/4 |
| 2009/0198831 | A1 | * | 8/2009 | Kusaka et al. | ................ | 709/236 |

FOREIGN PATENT DOCUMENTS

| JP | 09-233301 | | 9/1997 |
| JP | 2002-297467 | | 10/2002 |
| JP | 2004-214731 | | 7/2004 |
| JP | 2004-295671 | A | 10/2004 |
| JP | 2006-048707 | | 2/2006 |

\* cited by examiner

*Primary Examiner* — Matthew Henning

(74) *Attorney, Agent, or Firm* — McDonnell Boehnen Hulbert & Berghoff LLP

(57) ABSTRACT

A file-distribution apparatus includes a file-distribution unit configured to distribute an image file received from an image-forming device to a terminal device, a source-reference-information storage unit configured to store source-reference authorization information, and a security-management unit configured to determine whether a source-apparatus identifier corresponding to the image file is included in the source-reference information, and thus permits distribution of the image file if the determination is affirmative, and denies distribution of the image file if the determination is negative.

5 Claims, 14 Drawing Sheets

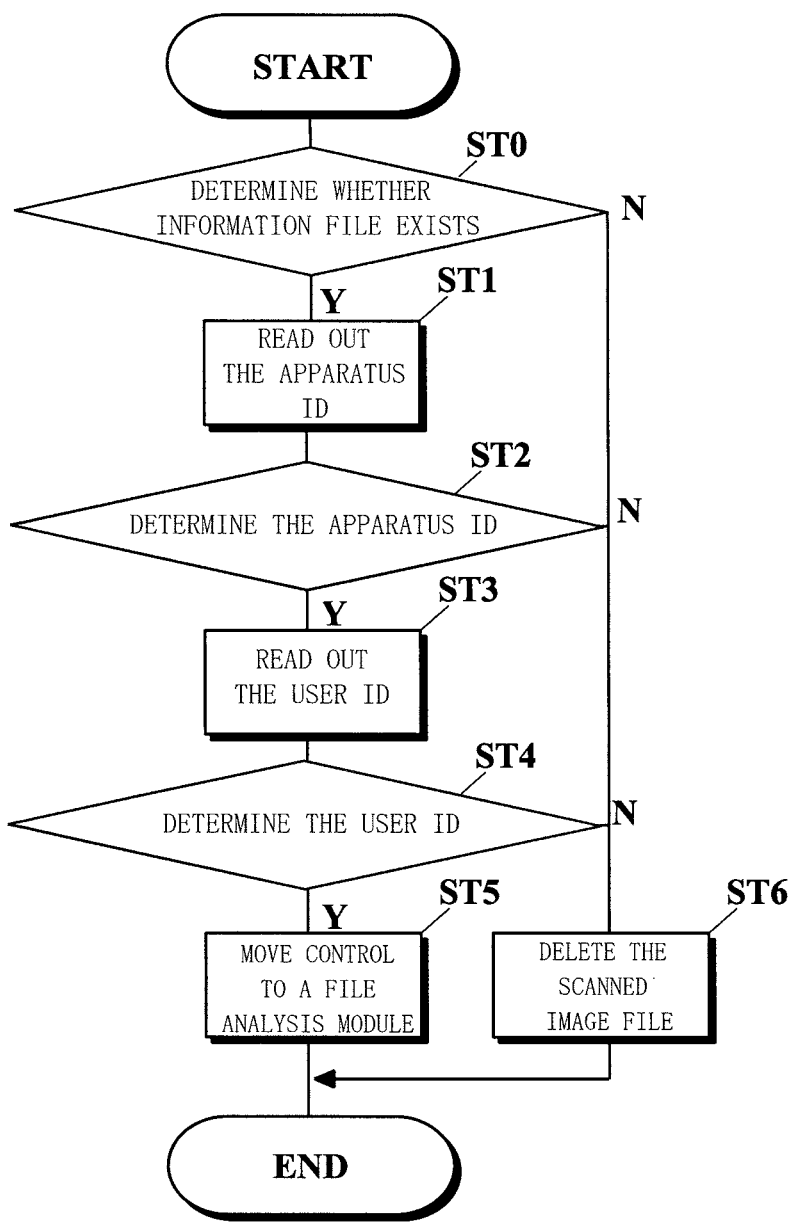

FIG.5

| ALLOCATION CONDITION | FILE DESTINATION ADDRESS | CHANGE OF FILE NAME | DISTRIBUTION TIME |
|---|---|---|---|
| [KW=Meeting]AND[KW=1000～15000] | A, B, C | | |
| [UID=Shizue]AND[KW=Ordercopy] AND[KW=GeneralAffairsDividion] | D | | Everyday10:00 |
| | E | Order[Count] | |
| [KW=???-???-????] | F | FAX[Now] | |
| [UID=Hanako]AND[MID=KM6235] AND([KW=Account]OR[KW=Finance]) | G | | |
| [UID=Taro]AND[Time<12:00] | H | | |
| [UID=Taro]AND[Time>=12:00] | I | | |
| [GID=Design]AND[Format=PDF] | J | | |
| [GID=Design]AND[Format=JPG] | K | | |

Info1

Info2

| SOURCE USER ID | SOURCE APPARATUS ID | CHARACTER STRING IN THE FILE NAME | FILE FORMAT | ALLOCATION DESTINATION |
|---|---|---|---|---|
| Design1 | KM6235 | Meeting | | A, B, C |
| | | Report | | D |
| | | Design | | E |
| | | | PDF | F |
| | | | | G |
| | KM6325 | | | H |
| Hanako | KM6235 | Account | | I |

FIG.13

```
<senders>
    <mfps>
        <info>
            <id>KM6235</id>
            <ip> 192.168.126.16</ip>
            <pkey>59d381a9...</pkey>
        </info>
        <info>
            <id>KM6245</id>
            <ip> 192.168.126.17</ip>
            <pkey>e493a80f...</pkey>
        </info>
            .
            .
            .
    </mfps>
    <users>
        <info>
            <id>Shizue</id>
            <email>Shizue@abc.co.jp</email>
        </info>
        <info>
            <id>Hanako</id>
            <email>Hana@abc.co.jp</email>
        </info>
            .
            .
            .
    </users>
</senders>
```

105A

FILE-DISTRIBUTION APPARATUS AND RECORDING MEDIUM HAVING FILE-DISTRIBUTION AUTHORIZATION PROGRAM RECORDED THEREIN

CROSS-REFERENCE TO RELATED APPLICATIONS

This application is based upon and claims the benefit of priority from corresponding Japanese Patent Application No. 2010-028779, filed in the Japan Patent Office on Feb. 12, 2010, No. 2009-254053, filed in the Japan Patent Office on Nov. 5, 2009, and No. 2009-254054, filed in the Japan Patent Office on Nov. 5, 2009, the entire contents of which are incorporated herein by reference.

BACKGROUND

1. Field of the Invention

The present disclosure relates to a file-distribution apparatus and a recording medium having a file distribution program recorded therein. More particularly, the present disclosure relates to a file-distribution apparatus that distributes an image file received from an image-forming apparatus over a network to a terminal device connected to the network, and to a recording medium having a file distribution program recorded therein.

2. Description of the Related Art

Systems to distribute files among computers can be built by using a file-sharing service and a file-sharing-service protocol, such as the Server Message Block (SMB) protocol. For example, a certain folder in a personal computer is used as a sharing folder that can be operated from an image-forming apparatus. In this case, a file of images scanned by the image-forming apparatus can be transmitted to the sharing folder at the personal computer. Since the file-sharing service is included in the operating system (OS) of the personal computer, it is possible to easily build the file-distribution system without adding a dedicated application.

There is an automatic transmission method in the related art, in which a data file and an automatic transmission control file are stored in a memory and the data file is transmitted according to the content of the automatic transmission control file.

However, in order to distribute an image file received from an image-forming apparatus over a network to one or more terminal devices connected to the network, it is necessary for the user of each terminal device that has received the image file to determine whether the image file is an authorized file.

Accordingly, it is required to provide a file-distribution apparatus and a file-distribution system with a simple configuration, which are capable of stopping distribution of an unauthorized file to reduce the burden on the user.

One-to-one correspondence is established between the name of a file to be transmitted and the e-mail address, etc. of a destination in the automatic transmission control file in the above automatic transmission method. It is necessary to describe the file name and information about the destination in the automatic transmission control file for every file to be transmitted. This problem also occurs in a case in which a file is allocated to a folder in the apparatus, to distribute (move) the file to the folder, and a case in which one file is allocated to multiple places to distribute the file to the multiple places.

Consequently, it is required to provide a file-distribution apparatus and a file-distribution system capable of distributing a file to a desired-allocation destination without specifying the allocation destination for every file to be distributed.

SUMMARY

According to an embodiment of the present disclosure, a file-distribution apparatus includes a file-distribution unit that distributes an image file received from an image-forming apparatus to a terminal device; a source-reference-information storage unit that stores source-reference information; and a security-management unit that determines whether a source-apparatus identifier corresponding to the image file is included in the source-reference information and permits distribution of the image file if the determination is affirmative or disable the distribution of the image file if the determination is negative.

According to an embodiment of the present disclosure, a computer-readable recording medium has recorded thereon a file distribution program, the program causing a computer to perform the steps of: reading out source-reference-authorization information from a storage unit, receiving an image file and related information associated with the image file, and determining whether a source-apparatus identifier in the related information is included in the source-reference-authorization information for the image file, if the determination is affirmative, distributing the image file, and if the determination is negative, disabling the distribution of the image file.

According to another embodiment of the present disclosure, a file-distribution apparatus includes a file-allocation-information storage unit that stores file-allocation information in which file-allocation conditions are associated with file allocation-destination addresses, a file-allocation-destination determining unit that determines a particular allocation-destination address of the file that is received on the basis of related information and the file-allocation information, and a file-distribution unit that distributes the file to the determined allocation-destination address of the file.

Additional features and advantages are described herein, and will be apparent from the following Detailed Description and the figures.

BRIEF DESCRIPTION OF THE DRAWINGS

In the accompanying drawings:

FIG. 2 is a flowchart schematically showing an example of a process in a security-management unit;

FIG. 5 illustrates an example of allocation condition-destination information;

FIG. 13 illustrates an example of source-reference information according to a fifth embodiment of the present disclosure.

DETAILED DESCRIPTION

Figure 8:
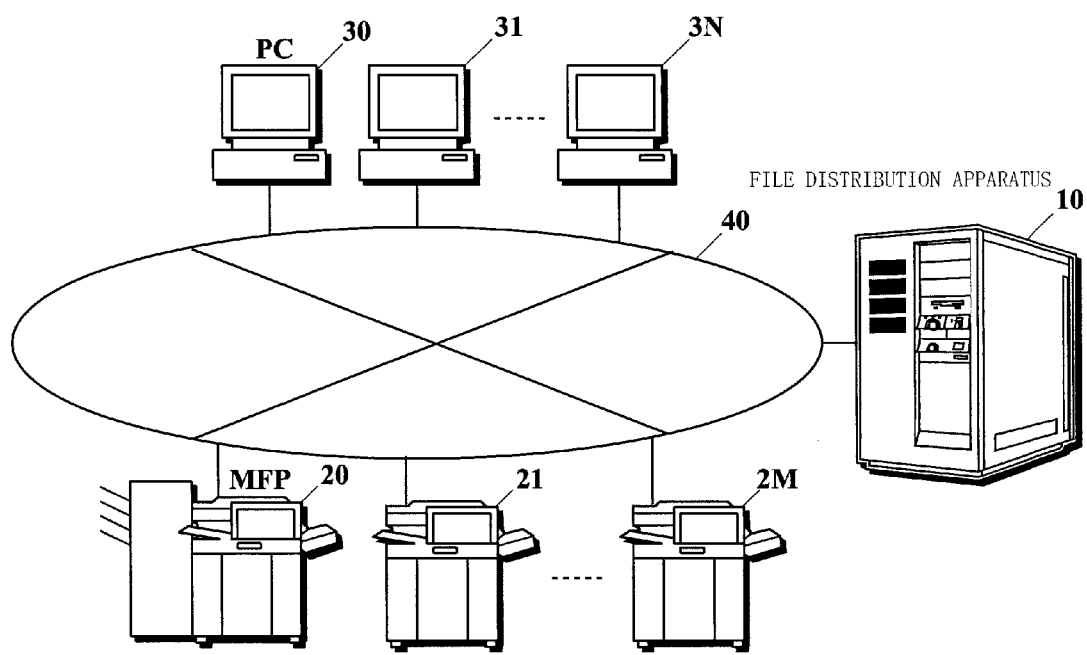
FIG. 8 schematically illustrates a file-distribution system according to a first embodiment of the present disclosure.

FIG. 8 schematically illustrates a file-distribution system according to a first embodiment of the present disclosure.

Referring to FIG. 8, a file-distribution apparatus 10 that is an intermediate of file transmission, image-forming apparatuses 20 to 2M serving as sources, and personal computers (PCs) 30 to 3N that are terminal devices serving as distribution destinations are connected to a network 40. The file transmission from any of the image-forming apparatuses 20 to 2M to the file-distribution apparatus 10 and the file transmission from the file-distribution apparatus 10 to one or more of the PCs 30 to 3N are performed by using the file-sharing service included in the OSs of the file-distribution apparatus 10, the image-forming apparatuses 20 to 2M, and the PCs 30 to 3N. Specifically, the sharing folder is created in an auxiliary storage device in the destination. The sharing folder can be operated from the source and files are transmitted to the sharing folder.

Figure 7:
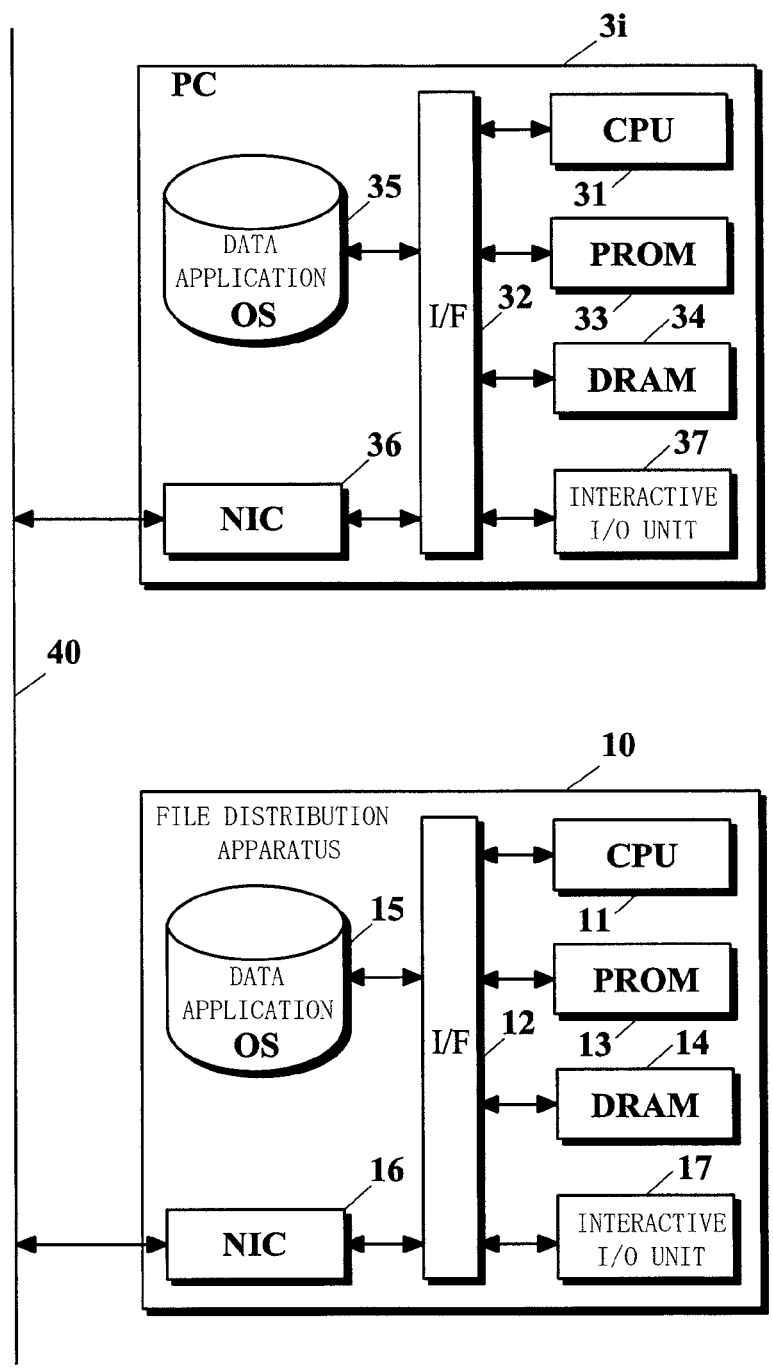
FIG. 7 is a block diagram schematically showing an example of the hardware configuration of a system including the file-distribution apparatus and the personal computer according to an embodiment of the present disclosure.

FIG. 7 is a block diagram schematically showing an example of the hardware configuration concerning the file transmission between the file-distribution apparatus 10 and a PC 3*i*. The PC 3*i* is any of the PCs 30 to 3N in FIG. 8.

In the file-distribution apparatus 10, a central processing unit (CPU) 11 is connected to a programmable read only memory (PROM) 13, a dynamic random access memory (DRAM) 14, a hard-disk drive 15, a network interface 16, and an interactive input-output unit 17 via an interface 12. In the example in FIG. 7, multiple kinds of interfaces are represented as one block 12.

The PROM 13 is, for example, a flash memory, and a basic input/output system (BIOS) is stored in the PROM 13. The DRAM 14 is used as a main memory. A virtual memory OS, various drivers, a file distribution application, and data including source-reference information and allocation condition-destination information Info1 are stored in the hard-disk drive 15. The hard-disk drive 15 is an example of a file-allocation-information storage unit. The network interface 16 is connected to the network 40. The interactive input-output unit 17 includes, for example, a keyboard, a pointing device, and a display device.

Figure 11:
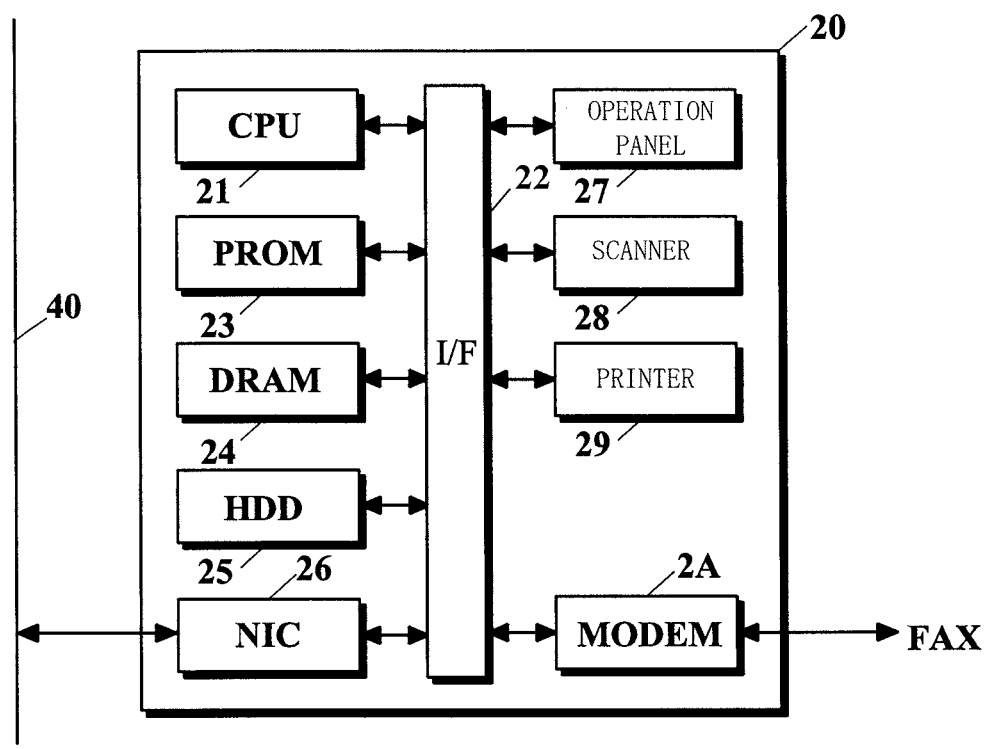
FIG. 11 is a block diagram schematically showing an example of the hardware configuration of an image-forming apparatus according to a fourth embodiment of the present disclosure.

Components 21 to 2A in the image-forming apparatus 20 correspond to the components 11 to 17 in the file-distribution apparatus 10 (See FIG. 11). An application for generating print data and a printer driver are stored in a hard-disk drive 25.

Components 31 to 37 in the PC 3*i* correspond to the components 11 to 17 in the file-distribution apparatus 10. An application for generating print data and a printer driver are stored in a hard-disk drive 35.

Figure 1:
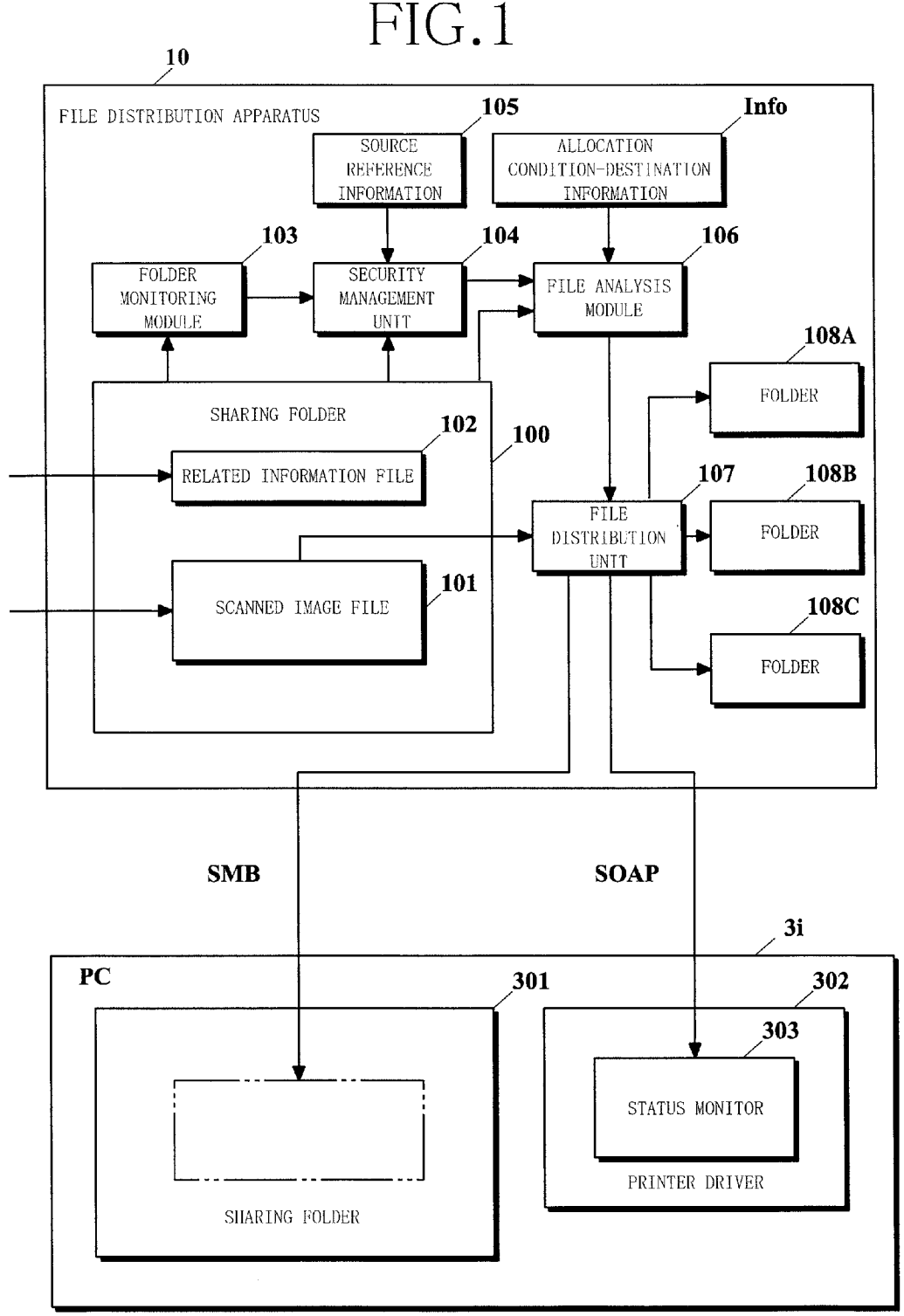
FIG. 1 is a functional block diagram concerning file distribution between a file-distribution apparatus and a personal computer according to an embodiment of the present disclosure.

FIG. 1 is a functional block diagram concerning file distribution between the file-distribution apparatus 10 and the PC 3*i*.

Each functional block in FIG. 1 is operated by the hardware and software of the corresponding computer, which cooperate with each other.

Figure 6:
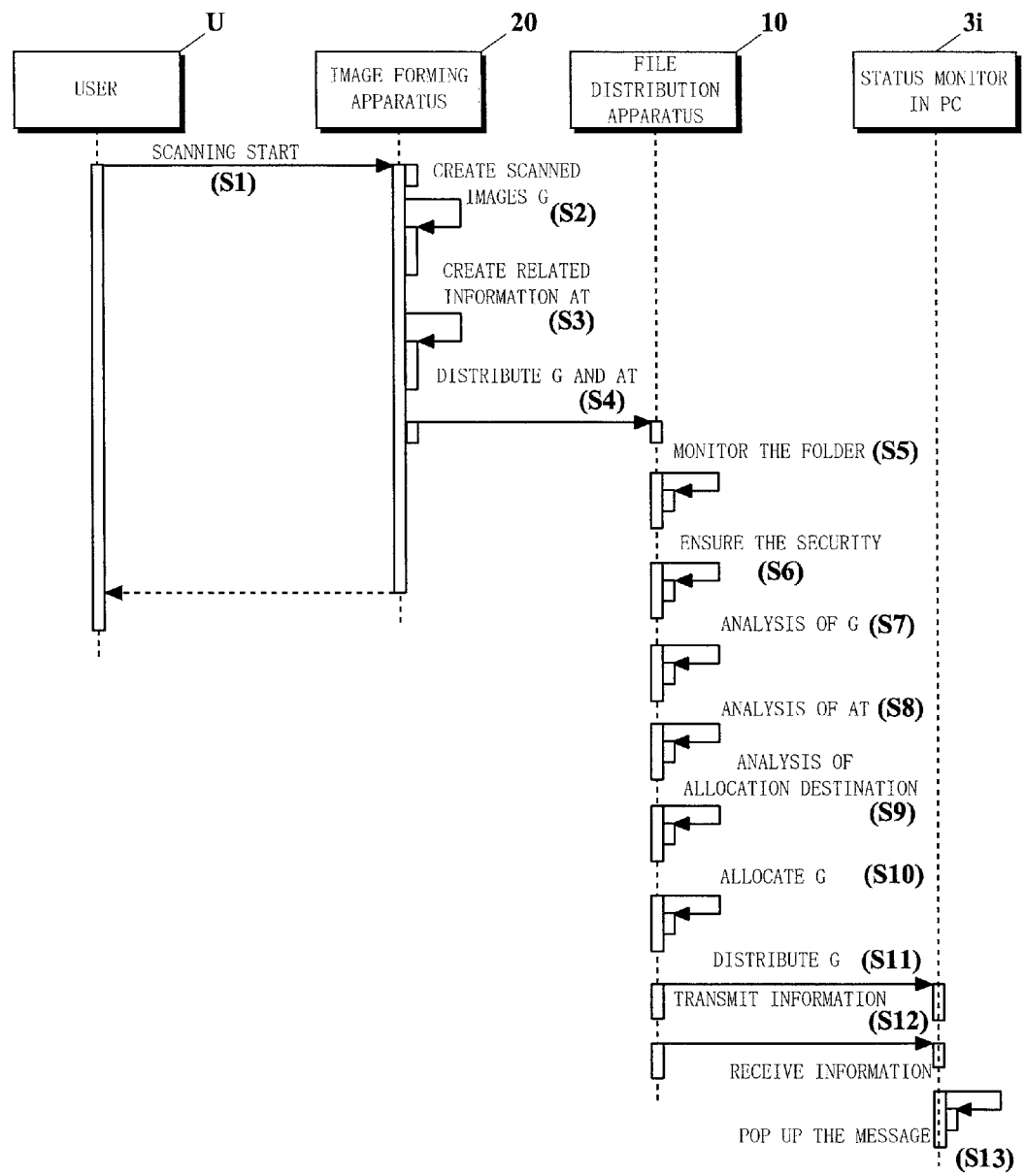
FIG. 6 is a sequence chart showing an example of a process of automatically transmitting a file of scanned images to a folder in the file-distribution apparatus or an external personal computer via the file-distribution apparatus.

FIG. 6 is a sequence chart showing an example of a process of automatically transmitting a file of scanned images to the PC 3*i* through the file-distribution apparatus 10. The scanned images are generated by the image-forming apparatus 20 that scans an original document image in response to an operation of a user U with the image-forming apparatus 20. Numbers with "S" in parentheses in the following description represent steps in the sequence of FIG. 6.

(S1) The user U inputs a user identifier (ID) (a group ID is included in the user ID) and a password into the image-forming apparatus 20 by operating the operation panel of the image-forming apparatus 20 or with an integrated circuit (IC) card to log into the image-forming apparatus 20. The user U selects a scanning function with the operation panel, selects conditions including a color or monochrome mode, the resolution, selects the format of the image file in readout of an image, and presses a scanning start button.

(S2) The image-forming apparatus 20 scans an original document image under the selected conditions in response to the pressing of the scanning start button to create a scanned-image file 101 of scanned images G in the memory or the auxiliary storage device in the image-forming apparatus 20.

Figure 3A:
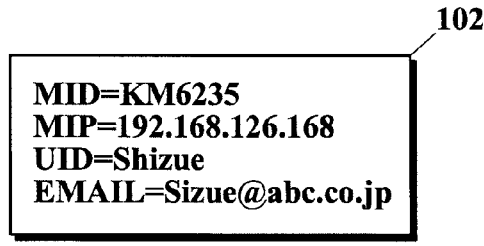
FIG. 3A illustrates an example of a related-information file.

(S3) The image-forming apparatus 20 reads out the above user ID and the corresponding e-mail address from a table in which each user ID is associated with the e-mail address. And the image-forming apparatus 20 reads out the apparatus ID and the Internet protocol (IP) address of the image-forming apparatus 20, to create a related-information file 102 of related information AT. The content of the related-information file 102 is shown in FIG. 3A. The apparatus ID (MID) and the IP address (MIP) of the apparatus in the related-information file 102 are source-apparatus information. The user ID (UID) and the e-mail address (EMAIL) of the user in the related-information file 102 are source-user information. The apparatus ID (MID) includes a type name and a serial number.

(S4) The image-forming apparatus 20 uses the file-sharing service of the OS to distribute the scanned-image file 101 of the scanned images G and the related-information file 102 of the related information AT to a sharing folder 100 in the file-distribution apparatus 10. As a result, the scanned-image file 101 and the related-information file 102 are stored in the sharing folder 100.

(S5) A folder monitoring module 103 in the file-distribution apparatus 10 monitors input of a file into the sharing folder 100 with an event notification function of the OS, included in service software running in the background. If the folder monitoring module 103 detects that a file is input into the sharing folder 100, the folder monitoring module 103 moves the control to a security-management unit 104.

The folder monitoring module 103 may be configured so as to determine whether a file is input into the file-distribution apparatus 10 in response to a time-out event of an interval timer.

(S6) The security-management unit 104 performs a process for ensuring the security described below of the files in the sharing folder 100.

FIG. 2 is a flowchart schematically showing an example of a process in the security-management unit 104. Numbers with "ST" in parentheses in the following description represent steps in the sequence of FIG. 2.

(ST0) The security-management unit 104 determines whether the related-information file 102 corresponding to the scanned-image file 101 exists in the sharing folder 100. If the related-information file 102 corresponding to the scanned-image file 101 exists in the sharing folder 100, the process goes to Step ST1. If the related-information file 102 corresponding to the scanned-image file 101 does not exist in the sharing folder 100, the process goes to Step ST6.

For example, the correspondence between the scanned-image file 101 and the related-information file 102 is established such that the main part of the file name of the scanned-image file 101 is equal to that of the related-information file 102 but the extension of the file name of the scanned-image file 101 is different from that of the related-information file 102. The file name of the scanned-image file 101 may be described in the related-information file 102 to associate the scanned-image file 101 with the related-information file 102.

(ST1) The security-management unit 104 reads out a pair of the apparatus ID and the IP address from the related-information file 102 as the source-apparatus information.

(ST2) The security-management unit 104 determines whether the pair of the apparatus ID and the IP address is included in source-reference information 105. If the determination is affirmative, the process goes to Step ST3. If the determination is negative, the process goes to Step ST6.

Figure 3B:
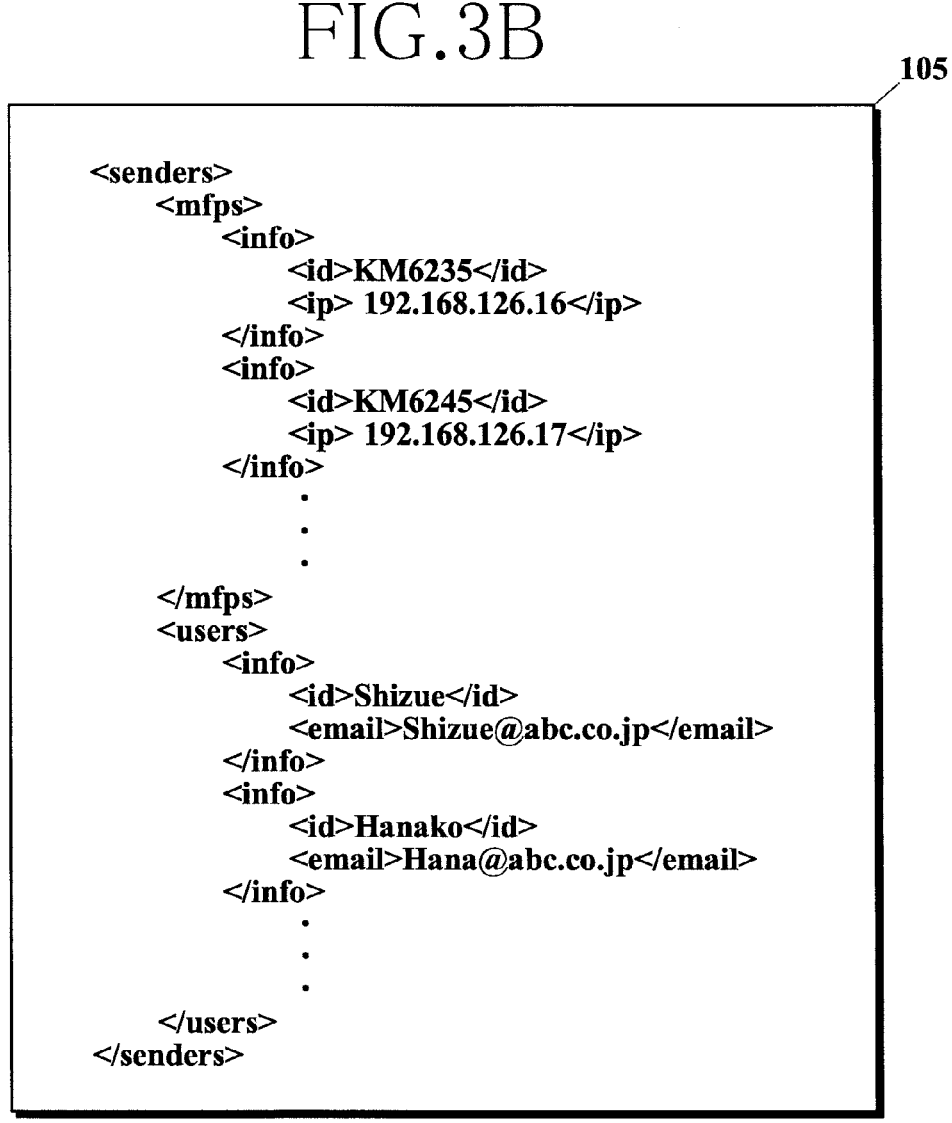
FIG. 3B illustrates an example of source-reference information.

The source-reference information 105 is represented in an Extensible Markup language (XML) file, as shown in FIG. 3B. The pair of the apparatus ID and the IP address of each of the image-forming apparatuses 20 to 2M connected to the network 40 and a pair of the user ID and the e-mail address of the user who uses each of the PCs 30 to 3N connected to the network 40 are described in the source-reference information 105.

(ST3) The security-management unit 104 reads out the user ID and the e-mail address from the related-information file 102 as the source-user information.

(ST4) The security-management unit 104 determines whether the pair of the user ID and the e-mail address is included in the source-reference information 105. If the determination is affirmative, the process goes to Step ST5. If the determination is negative, the process goes to Step ST6.

(ST5) The security-management unit 104 moves control to a file-analysis module 106. Then, the process is terminated.

(ST6) The security-management unit 104 deletes the scanned-image file 101 for which the related-information file 102 does not exist from the sharing folder 100 or deletes the related-information file 102 from the sharing folder 100 along with the scanned-image file 101 corresponding to the related-information file 102. Then, the process is terminated. Here, the security-management unit 104 creates a log (not shown) indicating the content of the scanned-image file 101 and the related-information file 102 and the deletion date and time thereof.

Figure 4:
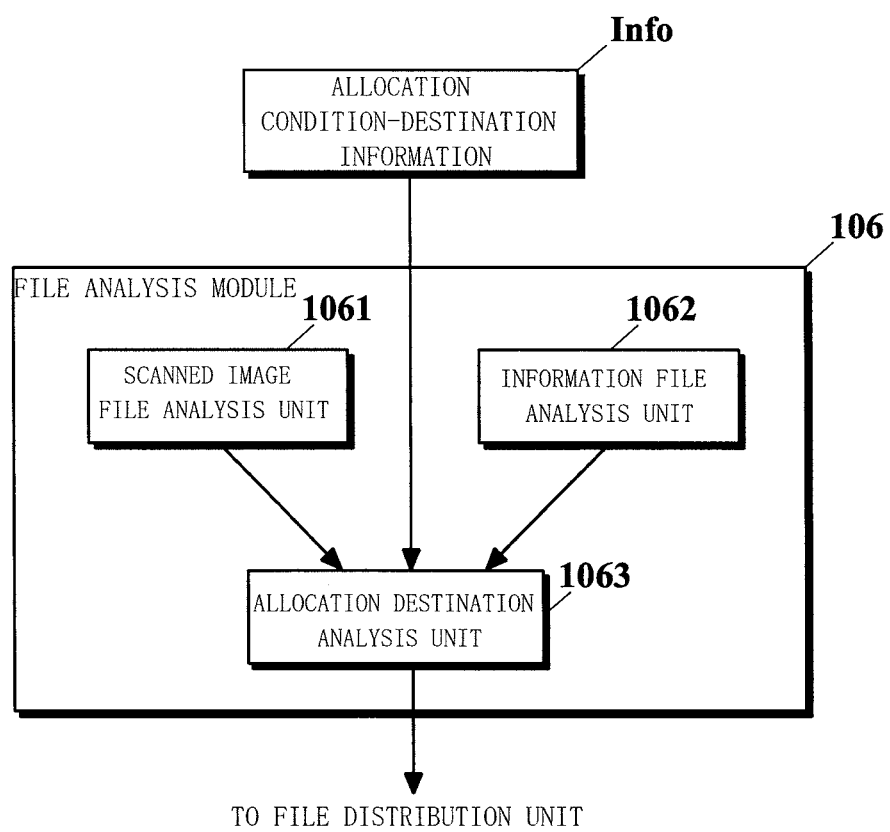
FIG. 4 is a block diagram showing an example of the configuration of a file-analysis module.

As shown in FIG. 4, the file-analysis module 106 includes a scanned-image file-analysis unit 1061, an information-file-analysis unit 1062, and an allocation-destination-analysis unit 1063. The file-analysis module 106 is an example of a file-allocation-destination determining unit.

(S7) Referring back to FIG. 6, the scanned-image file-analysis unit 1061 detects the file name and the image format (the extension of the file name) from the scanned-image file 101 of the scanned images G.

(S8) The information-file-analysis unit 1062 detects the user identifier and the source-apparatus identifier from the related-information file 102 of the related information AT.

(S9) The allocation-destination-analysis unit 1063 determines the Uniform Resource Identifier (URI) of the allocation-destination folder from the related-information file 102 including the file name, the image format, the user identifier, the source-apparatus identifier, and the date and time when the file was created (each of them is a file-related element), and the allocation condition-destination information Info1, such as the one shown in FIG. 5, and moves control to a file-distribution unit 107.

Referring to FIG. 5, each allocation condition includes the logical expression of at least one file-related element. The allocation-destination-analysis unit 1063 determines the file allocation-destination address corresponding to the logical expression to be the allocation-destination address of the file if the file-related information meets the logical expression, that is, if the value of the logical expression is "true." The logical expressions in FIG. 5 have the following meanings:

(1) The logical expression [KW=meeting]AND [KW=1000 to 15000] is "true" if "meeting" is included in the file name as a keyword KW, a serial number is included in the file name as keyword KW, and the serial number is within a range from 1000 to 15000.

(2) The logical expression [UID=Shizue]AND [KW=Ordercopy]AND[KW=GeneralAffairsDivision] is "true" if the user identifier UID is "Shizue" and "Ordercopy" and "GeneralAffairsDivision" are included in the file name as keywords KW.

(3) The logical expression [KW=???-???-????] is "true" if an arbitrary three-digit number, an arbitrary three-digit number, and an arbitrary four-digit number are connected with "-" in the file name as keywords KW, where "?" denotes an arbitrary one-digit number.

(4) The logical expression [UID=Hanako]AND [MID=KM6235]AND([KW=account]OR[KW=finance]) is "true" if the user identifier UID is "Hanako", the source-apparatus identifier MID is "KM6235", and "account" or "finance" is included in the file name as keyword KW.

(5) The logical expression [UID=Taro]AND[Time<12:00] is "true" if the user identifier UID is "Taro" and the time when the file was created, which is an attribute of the file, is before "12:00."

(6) The logical expression [UID=Taro]AND[Time≥12:00] is "true" if the user identifier UID is "Taro" and the time when the file was created, which is an attribute of the file, is "12:00" or is after "12:00."

(7) The logical expression [GID=Design]AND [Format=PDF] is "true" if the group identifier UID is "Design" and the file format is "PDF" (the file extension is .pdf).

Related information files A to K in a "File allocation-destination address" column in FIG. 5 each indicate the URI of a folder 108A, 108B, or 108C in the file-distribution apparatus 10, shown in FIG. 1, or the URI of a sharing folder outside the file-distribution apparatus 10. For example, A="SMB://192.168.126.162/SCAN/meeting/" and J="Design/".

Since the character string in the file name is included as a variable in the logical expression, as in the logical expression (1) to (4), it is possible to determine the allocation destination of the file according to the type of the content of the file.

In addition, since the user ID or the group ID of a division, a section, etc. is included as a variable of the logical expression, as in the logical expressions (2), (4) to (7), the allocation destination of each file can be differentially determined according to the user ID or the group ID even when the files have the content of the same type.

The logical expressions (5) and (6) are preferable particularly when the position of the recipient of the file is varied with time.

Since the logical expression (7) includes the file format as a variable of the logical expression, the allocation destination of each file can be differentially determined according to the file format even when the files have the content of the same type.

A "Change of file name" column in FIG. 5 means that the file name is changed to distribute the file with the name after the change. However, the blank means that the file name is not changed. For example, "Order[Count]" means that the file name is changed to a name resulting from addition of the character string of the value of a software counter [Count] that is incremented by one each time the file is distributed to the character string "Order". "FAX[Now]" means that the file name is changed to a name resulting from addition of the character string of the current date and time [Now] to the character string "FAX".

A "Distribution time" column in FIG. 5 means that the file is distributed at a predetermined time. However, the blank means that the file is immediately distributed. For example, "Everyday 10:00" means that the file is held in the file-distribution apparatus until 10:00 at that day and the file is distributed at 10:00.

If the file-related information of one file meets the allocation conditions in multiple lines in the allocation condition-destination information Info1 in FIG. 5, priority is given to upper lines. Specifically, the allocation conditions are sequentially checked from the upper lines and the line that is determined to be "true" first is applied. However, priority may be given to lower lines. In this case, the allocation conditions may be sequentially checked from the upper lines and the line that is determined to be "true" last may be applied. Alternatively, all the lines determined to be "true" may be applied, or one or more of the above rules may be selected.

(S10, S11) Referring back to FIG. 6, the file-distribution unit 107 distributes the scanned-image file 101 to the URI of the allocation-destination folder, determined in Step S9, through the file system in the OS or by using the SMB protocol. The related-information file 102 is then deleted.

(S12) The file-distribution unit 107 transmits information indicating that the scanned-image file 101 is distributed to a sharing folder 301 to a status monitor 303 in a printer driver 302 in the PC 3i, which is the distribution destination, when the distribution is performed. The transmission of the information is performed by using an existing protocol, such as Simple Object Access Protocol (SOAP) or Simple Network Management Protocol (SNMP), used by the status monitor 303, or another protocol.

For example, when SNMP is used, the image-forming apparatus 20 includes an SNMP agent that transmits the state information to the PC that is selected, among the PCs 30 to 3N. The status monitor 303 in each of the PCs 30 to 3N includes an SNMP manager that receives the state information about the image-forming apparatus 20 and displays the received state information on the screen of the own PC. The file-distribution unit 107 includes an SNMP manager that generates an InformRequest message and transmits the generated InformRequest message to the status monitor 303 by using SNMP.

(S13) The status monitor 303 pops up the content of the message on the screen of the PC 3i in response to the reception of the above notification, in the same manner as in the display of the state of the file-distribution apparatus 10.

According to the first embodiment, the related-information file 102 including the source apparatus ID and the source-user ID is received from the image-forming apparatus along with the scanned-image file 101. If the related-information file 102 does not exist or the source apparatus ID and the source-user ID are not included in the source-reference information 105, the scanned-image file 101 is deleted without being distributed. Accordingly, it is possible to ensure security with a simple configuration, thus reducing a burden on the user.

In addition, since the related-information file 102 is also used as file-allocation information, it is possible to ensure security and to distribute the file to a desired-allocation destination without specifying the allocation destination for every file to be distributed.

Furthermore, if the file-allocation condition includes the logical expression of at least one file-related element and the file-related information meets the logical expression, the file allocation-destination address corresponding to the logical expression is determined to be the allocation-destination address of the file. Accordingly, it is possible to easily set the file allocation condition.

A second embodiment of the present disclosure will now be described.

Figure 9:
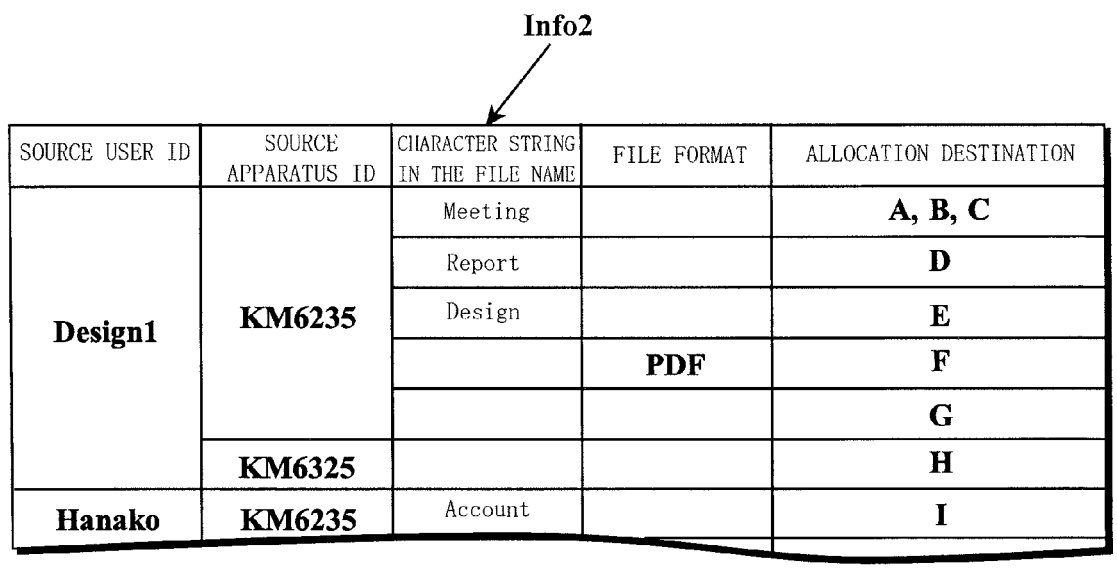
FIG. 9 illustrates an example of allocation condition-destination information.

FIG. 9 illustrates an example of the allocation condition-destination information of FIG. 1, which is the file-allocation information according to the second embodiment.

Although the allocation conditions in FIG. 5 explicitly included logical expressions of one or more file-related elements, the allocation conditions may substantially include the logical expressions of one or more file-related elements. For example, the allocation conditions may implicitly include the logical expressions of one or more file-related elements, as shown in FIG. 9. A blank in FIG. 9 means that the item can be arbitrarily set.

In the example of FIG. 9, a logical AND of the source-user identifier (ID), the source-apparatus identifier, the character string included in the file name, and the file format name (the extension of the file) is used as the allocation condition. The logical AND is implicitly included in FIG. 9.

For example, when the user ID is "Design1" (although the user ID is differentiated from the group ID in the first embodiment, both of the user ID and the group ID are identically processed in allocation condition-destination information Info2 in the second embodiment), the allocation destination is further varied according to whether the source-apparatus identifier is "KM6235" or "KM6325". When the source-apparatus identifier is "KM6235", the allocation destination is varied according to whether the character string included in the file name is "Meeting", "Report", "Design", or another string. When the character string included in the file name is equal to neither of "Meeting, "Report", and "Design", the allocation destination is further varied according to whether the file format is "PDF," or some other file format.

The allocation condition-destination information Info2 in FIG. 9 has a layered structure and can be represented in, for example, an XML file. The same priority rule as that of the first embodiment may be applied if the file-related information of one file meets the allocation conditions in multiple lines in the allocation condition-destination information Info2 in FIG. 9.

The second embodiment is otherwise similar to the first embodiment.

A third embodiment of the present disclosure will now be described.

Figure 10:
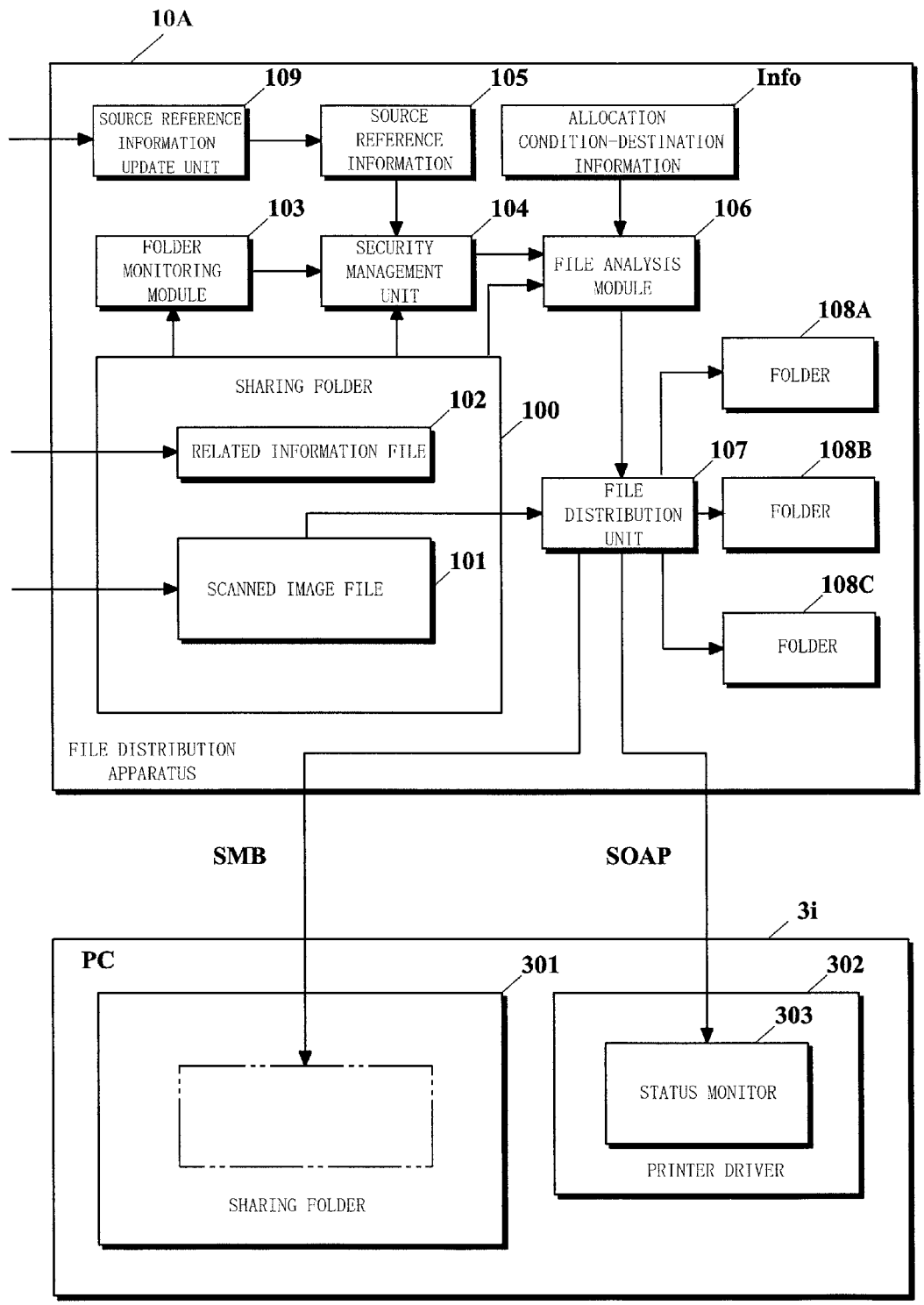
FIG. 10 is a functional block diagram concerning the file distribution between a file-distribution apparatus and a personal computer according to a third embodiment of the present disclosure.

FIG. 10 is a functional block diagram concerning the file distribution between a file-distribution apparatus and a personal computer according to the third embodiment.

A file-distribution apparatus 10A of the third embodiment includes a source-reference-information update unit 109, in addition to the components in the file-distribution apparatus 10 of FIG. 1.

In this third embodiment, a random code is added to the original apparatus ID periodically and before Step S3 in FIG. 6 in each of the image-forming apparatuses 20 to 2M in FIG. 8, and the apparatus ID having the random code added thereto is indicated to the source-reference-information update unit 109 in the file-distribution apparatus 10A. For example, when the original apparatus ID is "KM6235", "_AW3Q8" is added to "KM6235" to change the apparatus ID to "KM6235_AW3Q8" and the apparatus ID after the change is indicated to the source-reference-information update unit 109. The source-reference-information update unit 109 updates the corresponding apparatus ID in the source-reference information 105 in response to the reception of the apparatus ID.

The third embodiment is otherwise similar to the first embodiment.

According to the third embodiment, the apparatus ID of the image-forming apparatus is periodically updated at random. Accordingly, even if the related-information file 102 is illegally generated in an apparatus other than the image-forming apparatuses 20 to 2M and the scanned-image file 101 corresponding to the generated related-information file 102 is transmitted to the file-distribution apparatus 10A, the probability that the transmitted scanned-image file 101 is determined to be illegal in the security-management unit 104 is increased, thus reliably ensuring security.

The third embodiment is otherwise similar to the first or second embodiment.

A fourth embodiment of the present disclosure will now be described.

FIG. 11 is a block diagram schematically showing an example of the hardware configuration of the image-forming apparatus 20 according to the fourth embodiment. Since the components in the image-forming apparatus 20 are similar to the ones in the first embodiment, a description of the components described above in the first embodiment is omitted herein.

In the image-forming apparatus 20 in FIG. 11, a CPU 21 is connected to a PROM 23, a DRAM 24, a hard-disk drive 25, a network interface 26, an operation panel 27, a scanner 28, a printer 29, and a facsimile modem 2A via an interface 22.

The scanner 28 is used as an input device for printing and facsimile transmission and is also used to create an image file. The printer 29 includes a print engine, a paper-feed unit, a sheet-conveyance unit, and a paper-ejection unit. The printer 29 generates an electrostatic latent image on a photosensitive drum on the basis of bitmap data that is generated in and supplied from the DRAM 24, develops the electrostatic latent image with toner, transfers the toner image on a sheet to fix the image, and ejects the sheet.

Figure 12:
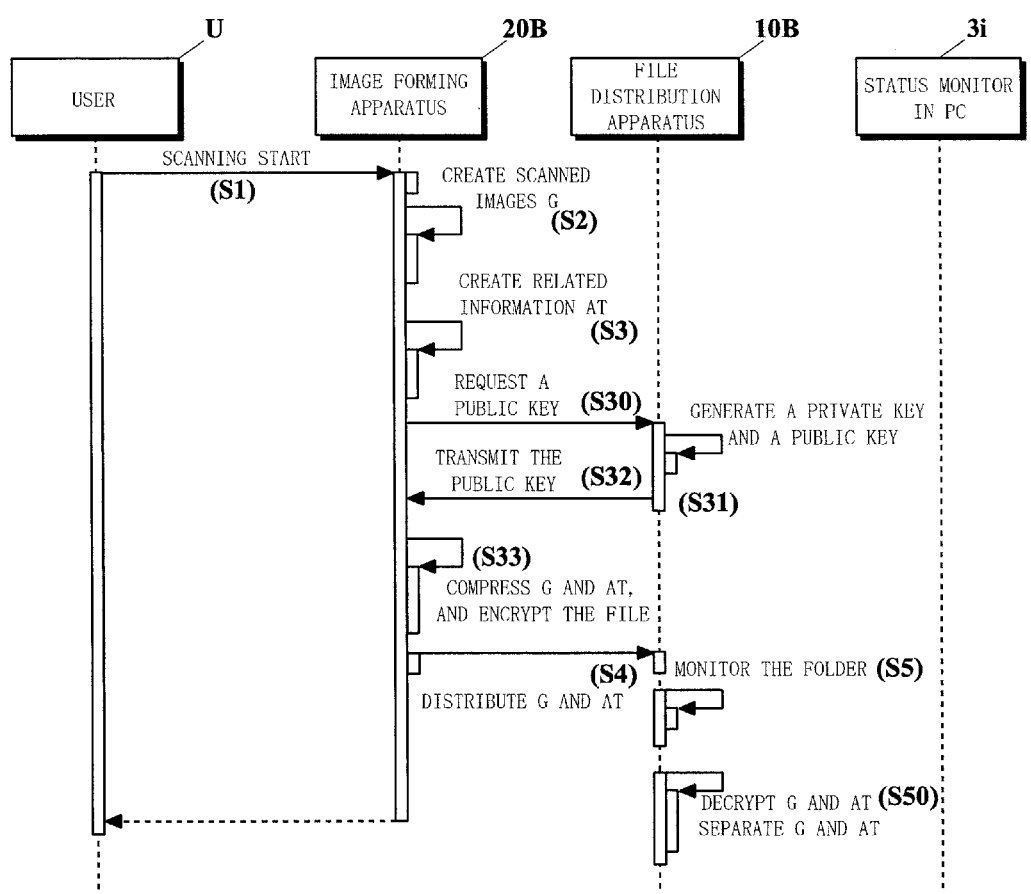
FIG. 12 is a sequence chart showing an example of part of a process in a scanned-image-file-distribution system according to the fourth embodiment of the present disclosure.

FIG. 12 is a sequence chart showing an example of part of a process in a scanned-image-file-distribution system according to the fourth embodiment. An image-forming apparatus 20B in FIG. 12 has the same hardware configuration as that of the image-forming apparatus 20.

The Steps from S1 to S3 are the same as the ones in FIG. 6. However, the related-information file 102 in FIG. 3A does not include the IP address of the image-forming apparatus 20B in Step S3 in FIG. 12.

(S30) The image-forming apparatus 20B requests a public key from a file-distribution apparatus 10B via the network interface 26 and the network 40.

(S31) The file-distribution apparatus 10B generates a pair of a private key and a public key from, for example, the IP address of the image-forming apparatus 20B and the current time.

(S32) The file-distribution apparatus 10B transmits the public key to the image-forming apparatus 20B.

(S33) The image-forming apparatus 20B receives the public key and merges the scanned images G generated in Step S2 with the related information AT generated in Step S3. For example, the image-forming apparatus 20B compresses the scanned images G and the related information AT to create one ZIP file. Then, the image-forming apparatus 20B encrypts the ZIP file with the public key.

The Steps S4 and S5 are the same as the ones in FIG. 6. However, the encrypted file is transmitted in Step S4 in FIG. 12.

(S50) The file-distribution apparatus 10B decrypts the received file with the private key in the security-management unit 104 before Step ST0 in FIG. 2 and separates the file resulting from the merging to acquire the scanned images G and the related information AT. Then, the process goes to Step ST0 in FIG. 2.

The subsequent steps are the same as the ones in FIG. 6. However, the IP address included in the header of the packet received in Step S4 is compared with the IP address included in the source-reference information 105 in Step S6 to confirm the source.

According to the fourth embodiment, the encryption can be adopted to prevent key tapping on the network 40, and the decryption with the private key in the file-distribution apparatus 10B allows the encryption with the public key forming a pair with the private key to be confirmed. In addition, it is possible to confirm that the scanned images G and the AT are not tampered. Furthermore, since the pair of the private key and the public key that has been generated in the file-distribution apparatus 10B most recently is used only once, it is possible to prevent unauthorized use by the key tapping.

A fifth embodiment of the present disclosure will now be described.

FIG. 13 illustrates source-reference information 105A used in the fifth embodiment, instead of the source-reference information 105 shown in FIG. 3B.

In the source-reference information 105A, the public key corresponding to the private key used in each image-forming apparatus is described as the content of a "pkey" tag for the confirmation of the source. The source-reference information 105A is otherwise the same as the source-reference information 105 in FIG. 3B.

Figure 14:
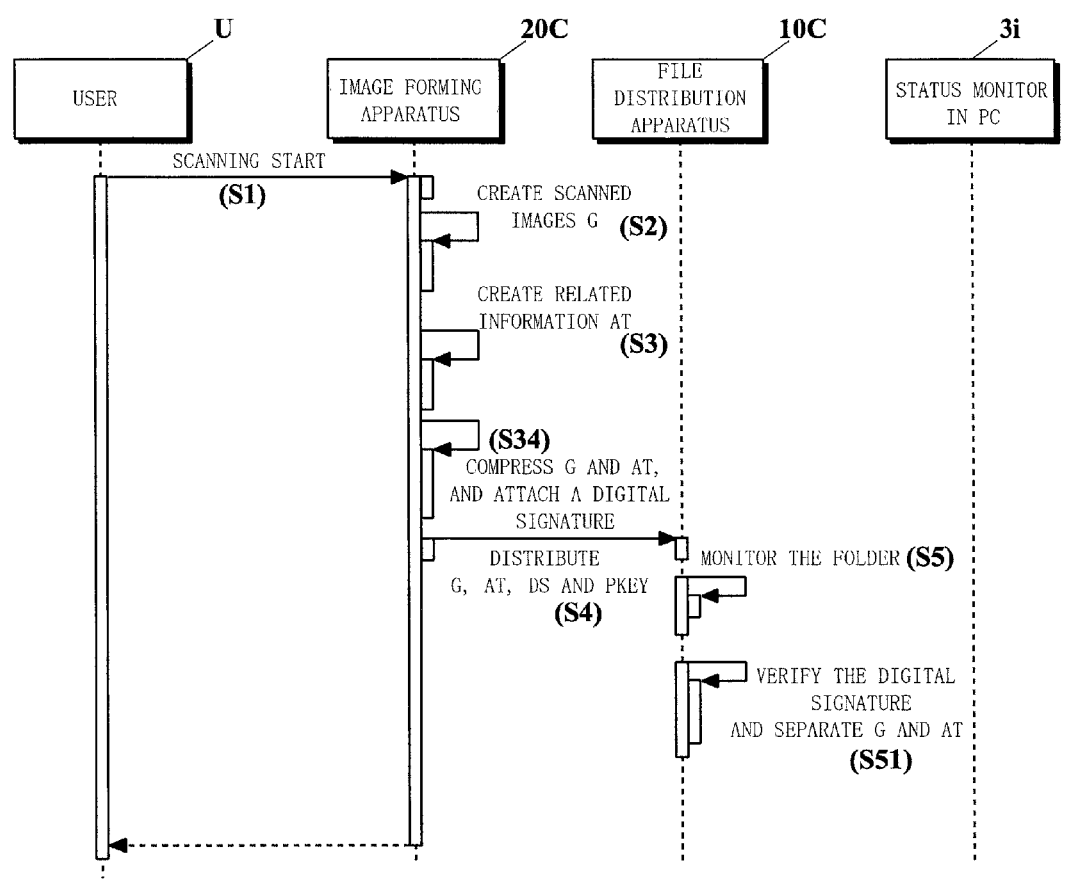
FIG. 14 is a sequence chart showing an example of part of a process in a scanned-image-file-distribution system according to the fifth embodiment of the present disclosure.

FIG. 14 is a sequence chart showing an example of part of a process in a scanned-image-file-distribution system according to the fifth embodiment. An image-forming apparatus 20C in FIG. 14 has the same hardware configuration as that of the image-forming apparatus 20.

Before the process in FIG. 14, the image-forming apparatus 20C generates, in advance, a pair of a private key and a public key from, for example, the IP address of the image-forming apparatus 20C and the current time, and registers the public key in the source-reference information 105A in a file-distribution apparatus 10C.

The Steps from S1 to S3 are the same as the ones in FIG. 12.

(S34) The image-forming apparatus 20C merges the scanned images G generated in Step S2 with the related information AT generated in Step S3 and attaches a digital signature to the file resulting from the merging with the private key. Specifically, the hash of the file resulting from the merging is generated by using a hash function and the hash is encrypted with the private key to acquire a digital signature DS.

The Steps S4 and S5 are the same as the ones in FIG. 12. However, the file resulting from the merging (merged file), the digital signature DS, and the public key (PKEY) are transmitted in Step S4 in FIG. 14.

(S51) The file-distribution apparatus 10C verifies the digital signature of the received merged file in the security-management unit 104 before Step ST0 in FIG. 2. Specifically, the file-distribution apparatus 10C generates the hash of the merged file with the hash function that is the same as the one in Step S34, compares the hash with the result of the decryption of the digital signature DS with the received public key, and passes the verification if the hash coincides with the result of the decryption of the digital signature DS. Then, the file-distribution apparatus 10C separates the merged file to acquire the scanned images G and the related information AT. Then, the process goes to Step ST0 in FIG. 2. If the verification is not passed, the process goes to Step ST6 in FIG. 2.

The subsequent steps are the same as the ones in FIG. 6. However, the IP address included in the header of the packet received in Step S4 is compared with the IP address included in the source-reference information 105 in Step S6 to confirm the source. In addition, the received public key is compared with the public key registered in the source-reference information 105A to confirm the source.

According to the fifth embodiment, the digital signature can be adopted to confirm the image processing apparatus serving as the source and to confirm whether the merged file has not been tampered with.

Although the preferred embodiments are described above, the present invention is also embodied by other combinations of the components described in the above embodiments, other configurations realizing the functions of the components, and other configurations supposed from the above configurations or functions by those skilled in the art.

For example, information other than the information described above may be added as the source information or the entire source apparatus ID may be changed to a random code. Since the source information is used for ensuring the security, it is sufficient to establish one-to-one correspondence between the source and the source information even if the user cannot identify the source information. A device certificate (electronic certificate including the type name and the serial number) issued by the apparatus or by a third-party organization (certificate authority) may be used as the source apparatus ID, and the validity of the device certificate that the file-distribution apparatus 10 receives from the source apparatus may be checked on the basis of the device certificate acquired from a management server or the certificate authority.

The URI of the allocation-destination folder may be determined by the file-distribution apparatus 10 by using other information, or by using only part of the information described above.

The function of the file-distribution apparatus 10 may be included in the image-forming apparatus 20 and the file may be directly transmitted from the image-forming apparatus 20 to the PC 3i.

In addition, the file to be distributed is not limited to the image file scanned by the scanner and may be a file received by a facsimile apparatus or another general file. The distribution may be performed by using an arbitrary protocol. For example, the distribution may be performed by using File Transfer Protocol (FTP), an e-mail to which a file is attached, or a facsimile apparatus.

Furthermore, both the encryption in the fourth embodiment and the digital signature in the fifth embodiment may be adopted.

What is claimed is:

1. A file-distribution apparatus comprising:
a file-distribution unit configured to distribute to a terminal device an image file and related information received from an image-forming device, wherein the related information includes an authorized-source-user identifier corresponding to the image file and a plurality of file-related elements, wherein the plurality of file-related elements include a file name, an image format, a user ID, a group ID, a source-apparatus identifier, a date when the image file was created, and a time when the image file was created;
a source-reference-information storage unit configured to store source-reference-authorization information, wherein the source-reference-authorization information includes the authorized-source-user identifier corresponding to the image file; and
a security-management unit configured to (i) determine whether the source-apparatus identifier in the related information is included in the source-reference-authorization information, (ii) permit distribution of the image file if the determination is affirmative, and (iii) disable the distribution of the image file if the determination is negative;
a file-allocation-information storage unit configured to store file-allocation information, wherein the file-allocation information includes file-association conditions associated with file-allocation destination addresses and a logical expression of at least one of the plurality of file-related elements; and
a file-allocation-destination determining unit configured to determine a particular allocation-destination address of the received image file on the basis of the related information and the file-allocation information,
wherein, if the file-related information meets the logical expression, the file-distribution unit distributes the file in accordance with the determined particular allocation-destination address corresponding to the logical expression.

2. The file-distribution apparatus according to claim 1, wherein the authorized-source-user identifier includes a public key,
wherein a file that includes the related information and to which a digital signature is attached is received from the image-forming device, and
wherein the security-management unit verifies the digital signature of the file and, if the verification is not passed, deletes the image file without distributing the image file.

3. The file-distribution apparatus according to claim 1, wherein a file that includes the related information and that is encrypted is received from the image-forming apparatus, and
wherein the file-distribution apparatus further comprises a decryption unit configured to decrypt the file.

4. The file-distribution apparatus according to claim 1, wherein the image-forming apparatus periodically updates the identifier of the apparatus serving as a source, the file-distribution apparatus further comprising:

a source-reference-information update unit configured to update the source-apparatus identifier in the source-reference information in response to the update by the image-forming apparatus.

5. A non-transitory computer-readable recording medium in which a file distribution program is recorded, the program, in response to execution by a computing device, causing a computing device to function as:

a file-distribution unit configured to distribute to a terminal device an image file and related information received from an image-forming device, wherein the related information includes an authorized-source-user identifier corresponding to the image file and a plurality of file-related elements, wherein the plurality of file-related elements include a file name, an image format, a user ID, a group ID, a source-apparatus identifier, a date when the image file was created, and a time when the image file was created;

a source-reference-information storage unit configured to store source-reference-authorization information, wherein the source-reference-information includes the authorized-source-user identifier corresponding to the image file; and a security-management unit configured to (i) determine whether the source-apparatus identifier in the related information is included in the source-reference-authorization information, (ii) permit distribution of the image file if the determination is affirmative, and (iii) disable the distribution of the image file if the determination is negative;

a file-allocation-information storage unit configured to store file-allocation information, wherein the file-allocation information includes file-association conditions associated with file-allocation destination addresses and a logical expression of at least one of the plurality of file-related elements; and a file-allocation-destination determining unit configured to determine a particular allocation-destination address of the received image file on the basis of the related information and the file-allocation information, wherein, if the file-related information meets the logical expression, the file-distribution unit distributes the file in accordance with the determined particular allocation-destination address corresponding to the logical expression.

* * * * *